(12) United States Patent
Anneken et al.

(10) Patent No.: US 6,517,757 B1
(45) Date of Patent: Feb. 11, 2003

(54) METHODS FOR MOLDING A PART AROUND AN INSERT

(75) Inventors: Donald J. Anneken, Burlington, KY (US); Lowell G. Green, East Enterprise, IN (US); Thomas C. Hennings, Newtown, OH (US); Harold Curtis Watkins, Franklin, OH (US)

(73) Assignee: The Plastic Moldings Corporation, Cincinnati, OH (US)

( * ) Notice: Subject to any disclaimer, the term of this patent is extended or adjusted under 35 U.S.C. 154(b) by 0 days.

(21) Appl. No.: 09/453,785

(22) Filed: Dec. 3, 1999

(51) Int. Cl.$^7$ .................. B29C 33/12; B29C 33/44; B29C 33/76; B29C 45/14
(52) U.S. Cl. .................. 264/161; 264/275; 264/278
(58) Field of Search ................ 264/161, 163, 264/259, 271.1, 275, 276, 278, 334; 425/121, 577

(56) References Cited

U.S. PATENT DOCUMENTS

| | | | |
|---|---|---|---|
| 1,847,414 A | | 3/1932 | Smith |
| 2,937,409 A | * | 5/1960 | Cole .................. 249/96 |
| 2,958,101 A | | 11/1960 | Guggenheim et al. |
| 2,983,958 A | | 5/1961 | Fay |
| 3,224,076 A | | 12/1965 | Johnson et al. |
| 3,238,287 A | | 3/1966 | Chapman |
| 3,899,567 A | | 8/1975 | Gorman |
| 3,998,824 A | * | 12/1976 | Otsuki et al. ............ 156/303.1 |
| 4,453,300 A | | 6/1984 | Klimek et al. |
| 4,455,274 A | | 6/1984 | Horney |
| 4,495,740 A | * | 1/1985 | Sarrazin et al. ............ 264/255 |
| 4,581,806 A | * | 4/1986 | Minoshima ............... 264/156 |
| 4,652,227 A | | 3/1987 | Aoki |
| 4,835,840 A | * | 6/1989 | Stokes ..................... 264/263 |
| 5,073,326 A | | 12/1991 | Craves et al. |
| 5,076,760 A | | 12/1991 | Weetman et al. |
| 5,087,404 A | | 2/1992 | Sparrow et al. |
| 5,182,032 A | | 1/1993 | Dickie et al. |
| 5,240,543 A | | 8/1993 | Fetterhoff et al. |
| 5,527,173 A | | 6/1996 | Miller et al. |
| 5,531,949 A | | 7/1996 | Heitfiled |
| 5,707,473 A | * | 1/1998 | Agrawal et al. ............ 156/245 |
| 5,846,470 A | * | 12/1998 | Funatsu et al. ........... 264/271.1 |
| 5,952,410 A | * | 9/1999 | Yokoyama et al. ......... 264/241 |
| 6,238,506 B1 | * | 5/2001 | Satoh et al. ............... 156/169 |

* cited by examiner

*Primary Examiner*—Angela Ortiz
(74) *Attorney, Agent, or Firm*—Dinsmore & Shohl LLP

(57) ABSTRACT

A pin for use in molding a part around an insert. The pin includes a shaft, and a head portion positioned at one end of the shaft. The head portion of the pin has a sharp edge which extends about at least a portion of its circumference. The pin is configured such that it may be positioned in a mold above an insert so that the molding material will flow across the upper surface of the head portion into the mold. A method of molding a part around an insert using the pin is also provided.

20 Claims, 8 Drawing Sheets

METHODS FOR MOLDING A PART AROUND AN INSERT

BACKGROUND OF THE INVENTION

1. Field of the Invention

The present invention relates to the molding of a part around an insert. More particularly, the present invention provides methods and apparatus which may be used, for example, in the injection molding of a part around an insert such as a bearing assembly.

2. Description of Related Art

In order to provide an insert in a molded part, the insert is generally either placed into the mold prior to the molding process, or is inserted into the part after molding has been completed. Positioning the insert in the mold prior to the molding operation can be problematic, particularly when a portion of the insert must remain exposed (i.e, not covered by the molding material, such as plastic). For example, during plastic injection molding, molten plastic is urged into a mold cavity. If an insert is positioned in the mold cavity prior to the injection of molten plastic, the heat and pressure required during the injection of molten plastic may deform or otherwise damage the insert. In addition, in order to ensure that a portion of the insert is not covered by the plastic, that portion of the insert must be masked or otherwise protected without interfering with the molding process. Proper alignment of the insert in the mold cavity can also be difficult.

As an alternative to molding the part around the insert, a two-step process may be employed wherein the part is first molded without the insert present. Thereafter, the insert is inserted into a suitably-sized recess or other opening in the molded part. This two-step method, however, is labor intensive. In addition, it can be difficult to properly align the insert within the part, and to ensure that the insert remains in place. For example, an insert such as a bearing assembly may need to be secured within a recess in the part by adhesive or other suitable means.

SUMMARY OF THE INVENTION

The present invention provides a pin for use in molding a part around an insert, wherein the pin comprises:

(a) a shaft; and (b) a head portion positioned at one end of the shaft, the head portion having a sharp edge extending about at least a portion of its circumference.

The pin is configured such that it may be positioned in a mold above an insert so that the molding material will flow across the upper surface of the head portion of the pin into the mold.

In another embodiment of the present invention, a method of molding a part around an insert is provided. This method comprises the steps of:

(a) providing an insert (such as a bearing assembly), the insert having a passageway therethrough;

(b) providing a pin, the pin comprising a shaft and a head portion positioned at one end of the shaft, the head portion having a sharp edge extending about at least a portion of its circumference;

(c) positioning the pin and the insert within a mold for a part to be molded, with the shaft of the pin positioned within the passageway of the insert;

(d) flowing molding material (such as plastic, rubber or metal) across the upper surface of the head portion of the molding pin into the mold and about the insert, thereby forming a part having the insert therein; and (e) urging the pin away from the part such that the sharp edge of the head portion releases the pin from the part.

In yet another molding method according the present invention, a method of molding a part around an insert comprises:

(a) providing an insert, the insert having a passageway therethrough;

(b) providing a pin, the pin comprising a shaft, a head portion positioned at one end of the shaft, and a bore which extends at least partially through the shaft;

(c) providing a mold, the mold including an alignment member;

(c) positioning the pin and the insert within a mold for a part to be molded, with the shaft of the pin positioned within the passageway of the insert, and the alignment member of the mold extending at least partially into the bore; and (d) flowing molding material across the upper surface of the head portion of the molding pin into the mold and about the insert, thereby forming a part having the insert therein.

DETAILED DESCRIPTION OF THE PREFERRED EMBODIMENTS

The present invention is directed to a method of molding a part around at least a portion of an insert, as well as a molding pin which may be used in the molding methods of the present invention. Although the present invention will be described in conjunction with the injection molding of a plastic part, it will be understood that the scope of the present invention is not so limited. The methods described and claimed herein can be used in a variety of other molding processes, such as rubber molding, injection molding of plastics (both thermoplastic and thermoset materials), and metal molding (e.g., thixotropic metal molding). The methods and apparatus of the present invention, for example, allow for the molding of a part around an insert such that the molding material (e.g., plastic) extends about the circumference of the insert without completely encasing the insert in the molding material. As used herein, the term "plastic" is intended to encompass any polymer which can be molded into an article, including both thermosetting and thermoplastic materials. Exemplary plastics which may be used in the methods of the present invention include engineering grade resins (e.g., nylon), particularly those which include filler material.

The present invention as described and claimed herein is also not limited to the molding of a part around any particular type of insert. As will be further understood from the description of the molding process of the present invention, the molding pin 10 used in the present invention can be sized and shaped to facilitate the molding of a part around a variety of inserts. Nevertheless, the apparatus and methods of the present invention are particularly useful for molding a part around a bearing assembly, including include roller type, ball type (sealed and non-sealed), and bushings (e.g., brass, bronze or copper bushings). Alternatively, the apparatus and methods of the present invention are useful for molding a part around other assemblies, such as threaded and non-threaded inserts (whether round or non-round), particularly those which required that some part of the insert remain exposed after the molding process is completed.

The methods and apparatus described and claimed herein are not limited to the molding of any particular part, and that shown in the accompanying drawings and described herein is merely exemplary. The methods and apparatus of the present invention may be used to mold a variety of parts around an insert, wherein the molding material extends about at least a portion of the circumference of the insert. Exemplary parts which may be molded according to methods of the present invention include ABS motor end frames, other automotive structural members, window lift gear motor housings, and any other parts requiring in-molded bearings.

Figure 1:
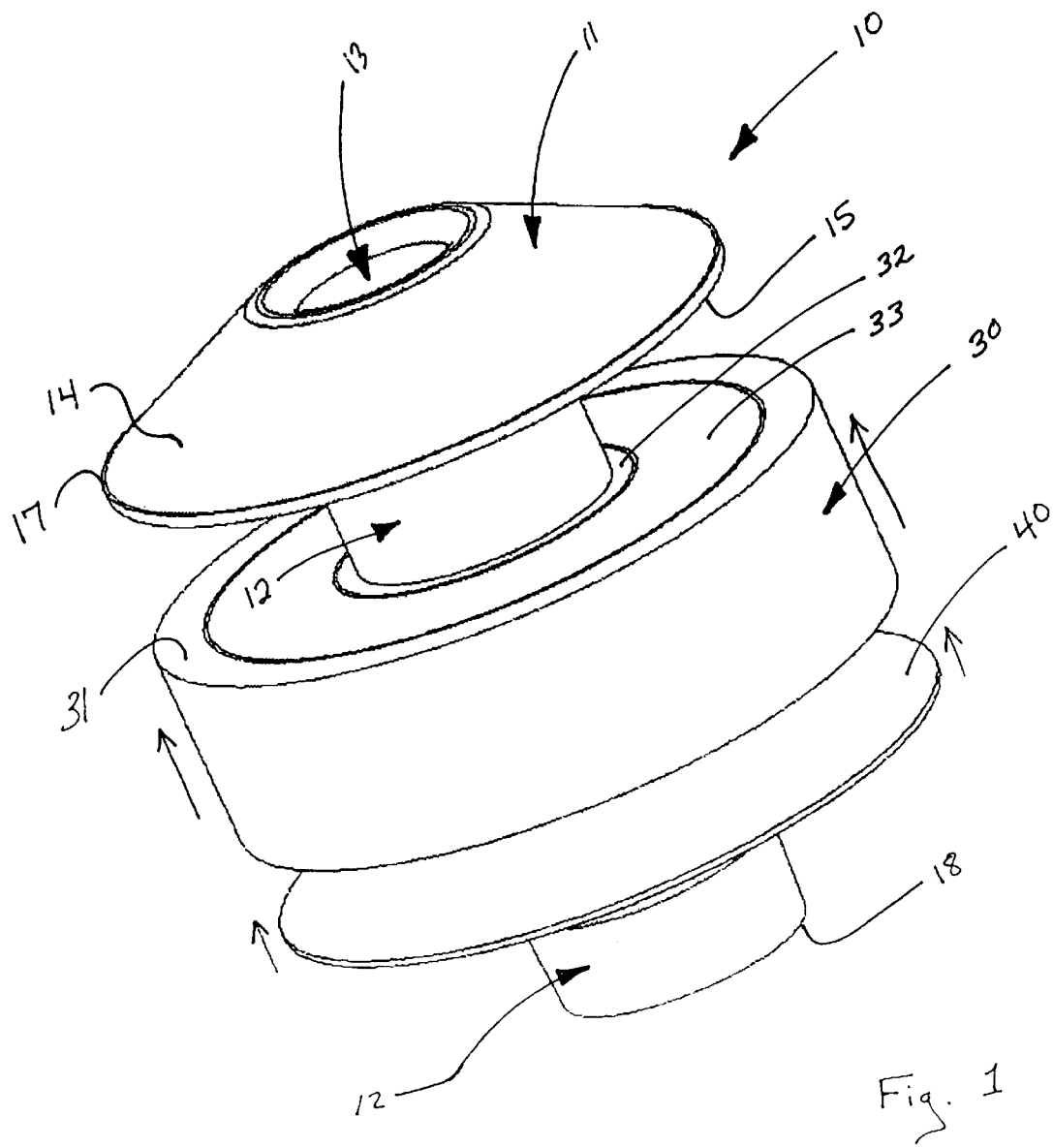
FIG. 1 is a perspective view of a molding pin and bearing assembly according to an embodiment of the present invention.
Figure 2:
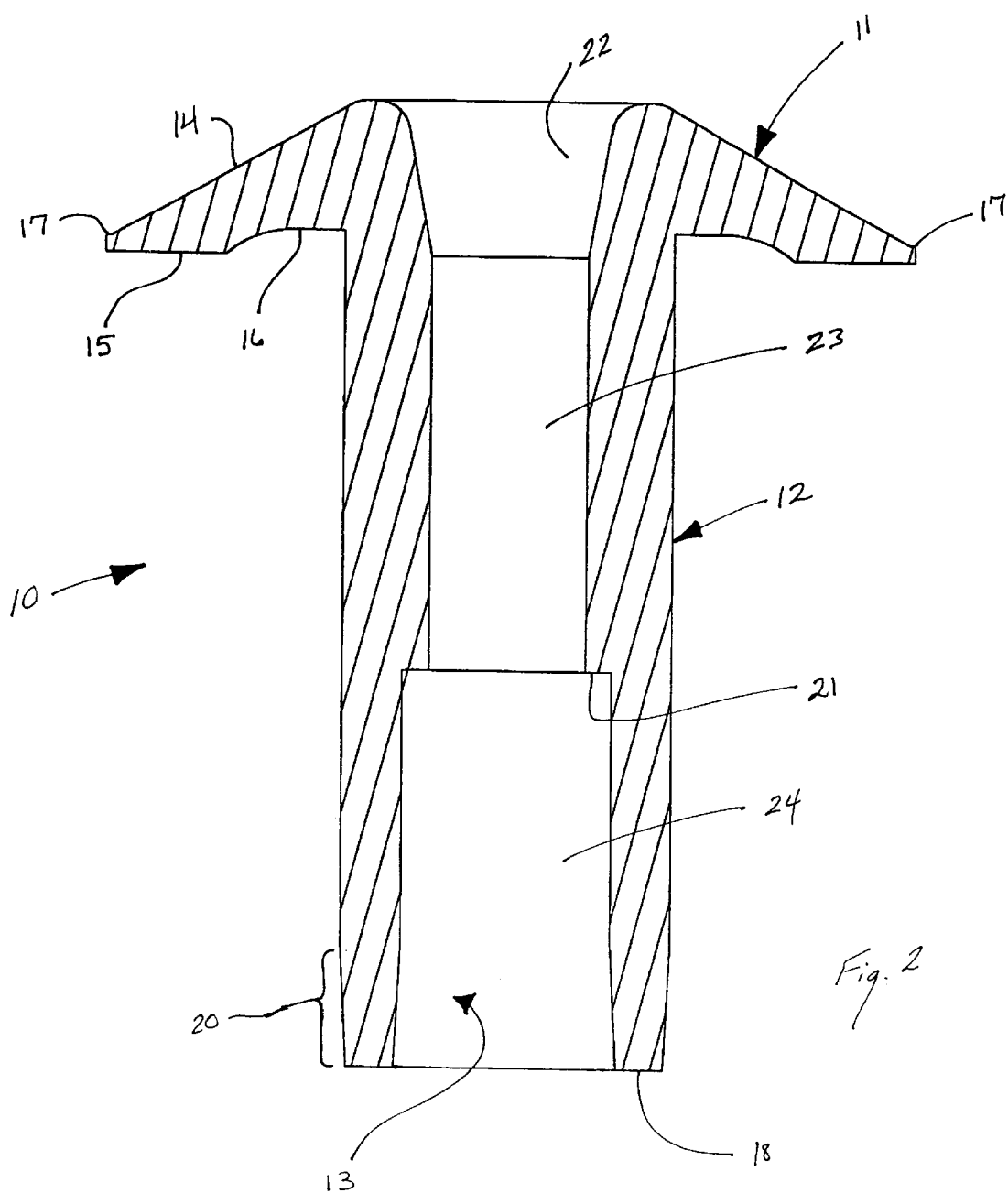
FIG. 2 is a cross-sectional view of the molding pin depicted in FIG. 1.

FIG. 1 is a perspective view of an embodiment of a molding pin 10 according to the present invention, and FIG. 2 is a cross-sectional view of molding pin 10. Molding pin 10 generally comprises a head portion 11 positioned at one end of a shaft 12. As best seen in FIG. 2, shaft 12 may be generally cylindrical in nature, and has a bore 13 extending at least partially therethrough. The interior and exterior surfaces of shaft 12 at lower portion 20, however, preferably taper slightly towards each other, as shown in FIG. 2. The tapering of the exterior surface of shaft 12 facilitates the insertion of shaft 12 into a passageway in the insert (such as the central opening of a bearing assembly), while the tapering of the interior surface of shaft 12 (i.e, the tapering of bore 13) facilitates the positioning of the molding pin on an alignment member within a mold.

Bore 13 of shaft 12 preferably also preferably includes a shoulder 21. Shoulder 21 may be located at a variety of locations within shaft 12. However, in a preferred embodiment, shoulder 21 is located in the central region of bore 13 (as shown in FIG. 2). In this manner, the diameter of bore 13 is narrower in upper portion 23 as compared to lower portion 24. It is also preferred that bore 13 extends through head portion 11 as shown, and flares outwardly in head portion 11 as shown in FIG. 2. As further described herein, flared portion 22 will receive the initial "cold slug" of molten plastic (i.e., the initial portion of molded plastic injected into the mold which tends to be somewhat cold and solidified). The tapering of flared portion 22 also aids in the removal of the cold slug after molding has been completed.

Head portion 11 of molding pin 10 has an upper surface 14 and a lower surface 15. Upper surface 14 preferably has a frusto-conical shape, as shown. Alternatively, upper surface 14 may be conical in shape, particularly if bore 13 does not extend through head portion 11. While upper surface 14 may even be flat or have a variety of other shapes, a frusto-conical or conical shape is preferred in order to facilitate the flow of molten plastic across upper surface 14 into the mold cavity (as further described below). Lower surface (or underside) 15 of head portion 11 is preferably flat near the periphery of head portion 11, and includes a recessed, annular portion 16 adjacent shaft 12. Recessed portion 16 provides clearance, simplifies the machining of molding pin 10, provides relief which reduces or eliminates load on the inner race of the bearing 30, and ensures that lower surface 15 of head portion 11 nests against and fully seals the outer race of the bearing.

Figure 3:
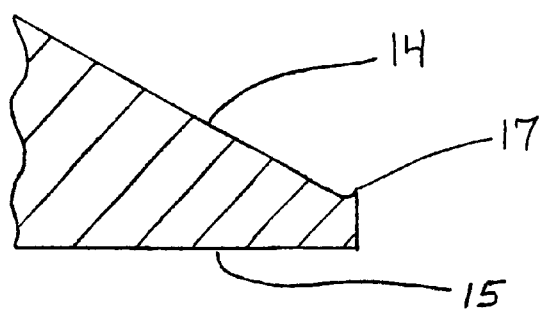
FIG. 3 is a cross-sectional view of a portion of the molding pin of FIGS. 1 and 2.

As best seen in FIG. 3 which is an enlarged cross-sectional view of the periphery of head portion 11, a flange 17 is preferably provided at the periphery of head portion 11. Flange 17 provides a sharp edge which may be used to facilitate removal of molding pin 10 from the part after the molding process has been completed, and preferably extends upwardly away from head portion 14. Flange 17 should be sufficiently sharp to allow for removal of molding pin 10, as further described below. Flange 17 will essentially act as a knife edge, and will cut through the molding material (e.g., plastic) so that molding pin 10 may be removed from the part after molding has been completed. A keen edge is generally not needed in order to cut through the solidified plastic after molding, however, certain molding materials may require a sharper edge than others. Molding pin 10 may be made from a variety of materials, particularly metals such as stainless steel, brass, or other through hardened tool steels. By way of example, molding pin 10 may be cast or forged as a unitary piece.

In order to use molding pin 10 in the molding methods of the present invention, molding pin 10 must be assembled with the insert. As mentioned previously, the insert about which the part is to be molded can comprise any of a number of structures, such as a bearing assembly 30. As is well-known to those skilled in the art, bearing assembly 30 is generally cylindrical in nature, and includes an outer ring 31, an inner ring 32, and an optional seal member 33. An addition seal member may also provided on the opposite side of bearing assembly 30. The rolling elements (e.g., balls or rollers) are positioned within the annular space between the inner and outer rings. A cage may also be provided between the inner and outer rings in order to separate the rolling elements from one another. It must be stressed, however, that bearing assembly 30 is merely exemplary of one type of insert which may be used in conjunction with the methods of the present invention, and other types of bearing assemblies or inserts may be used in its place.

Shaft 12 of molding pin 10 should be sized so that lower end 18 of shaft 12 may be readily inserted through the center of bearing assembly 30 (i.e., through the center of inner ring 32) as shown in FIG. 2. Preferably, shaft 12 will exhibit little side-to-side play when fully inserted into the central passageway of bearing assembly 30 (i.e., the central opening through inner ring 32), while still being readily removable from bearing assembly 30 after molding has been completed. By filing the central passageway of bearing assembly 30, shaft 12 of molding pin 10 will prevent bearing assembly 30 from being compressed or otherwise deformed during the molding process.

Figure 4:
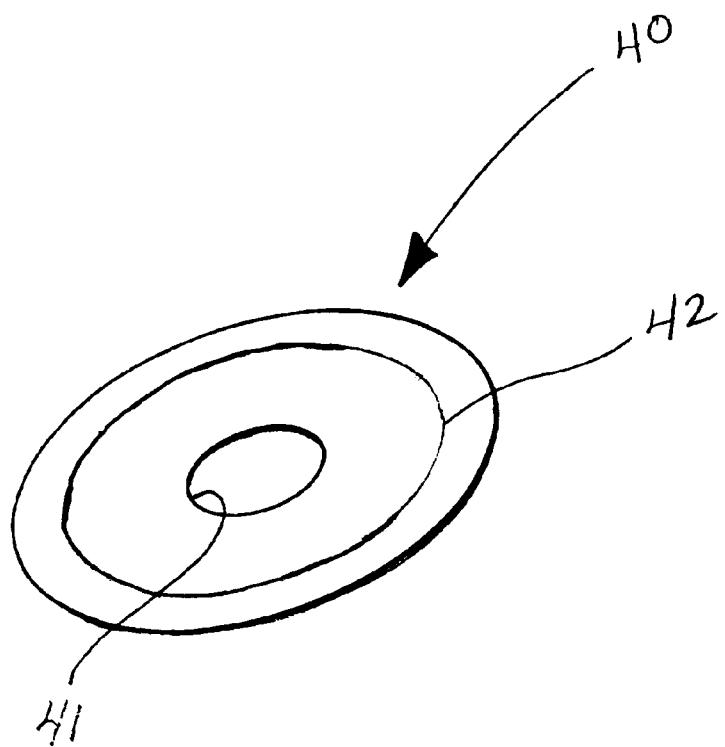
FIG. 4 is a perspective view of a barrier member according to an embodiment of the present invention.

As also shown in FIG. 1, a barrier member 40 may also be provided. Barrier member 40 essentially comprises a thin, disc-like member which may be positioned on shaft 12 directly beneath bearing assembly 30. As best seen in FIG. 4, barrier member 40 includes a central aperture 41 which is sized and positioned to accommodate shaft 12 therethrough.

Barrier member 40 is intended to protect bearing assembly 30 from excess heat during molding, and also acts as a seal to prevent molten plastic from contacting portions of the bearing assembly. Thus, barrier member 40 may be made from any of a variety of materials capable of accomplishing one or both of these functions. For example, barrier member 40 may be made from a heat resistant and fire retardant material such as NOMEX fire retardant fabric. Barrier member 40 also preferably includes a line of weakness 42 (as shown in FIG. 4) which facilitates removal of barrier member 40 after molding has been completed.

Figure 5:
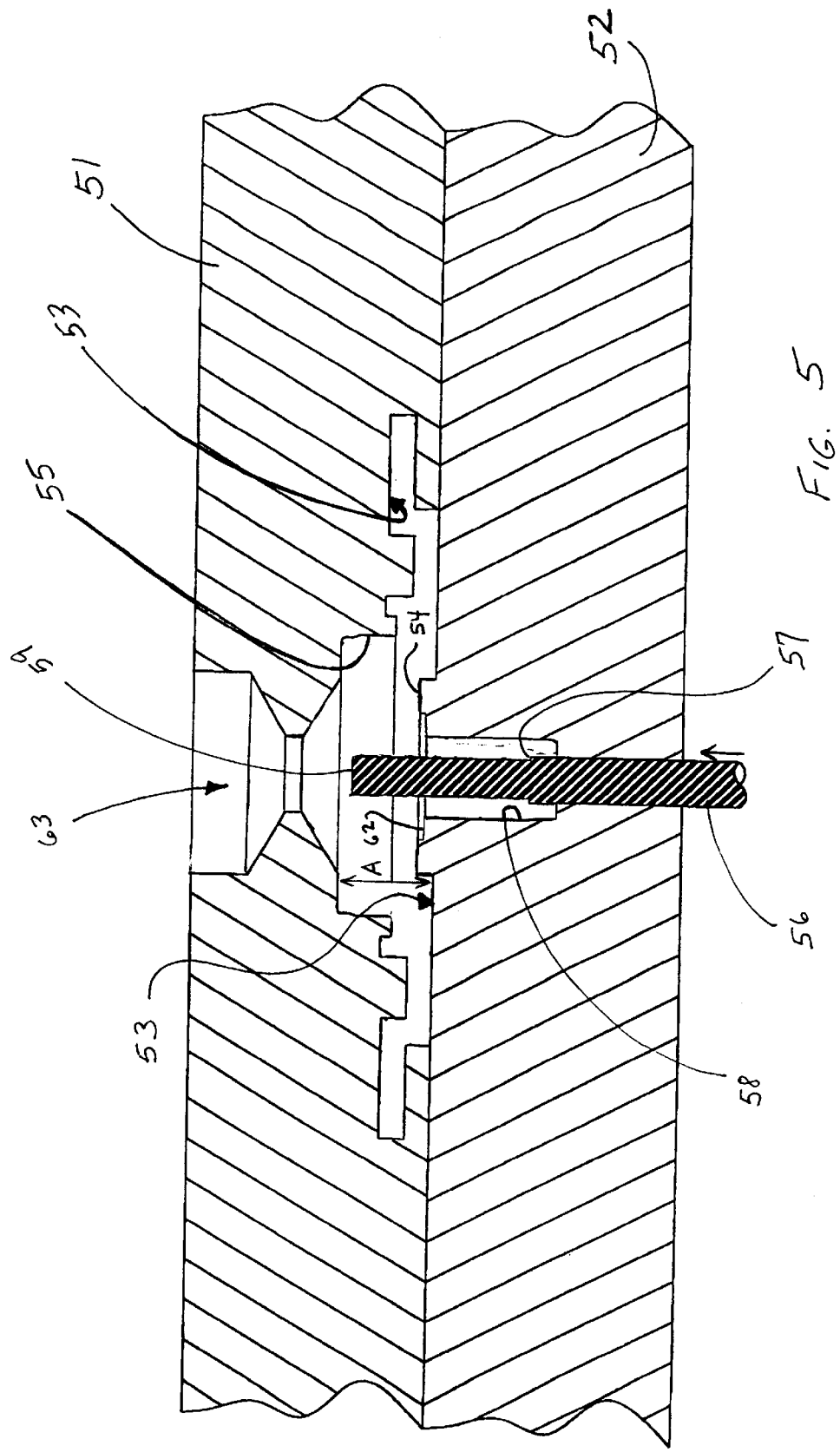
FIG. 5 is a cross-sectional view of a mold assembly which may be used in the methods of the present invention.

Molding pin 10, bearing assembly 30 and barrier member 40 are assembled in the manner shown in FIG. 1, with the upper surface of the bearing assembly positioned against lower surface 15 of head portion 11 of the molding pin. As mentioned previously, recessed portion 16 provided on lower sur face 15 of the head of the molding pin will eliminate load on inner ring 32 of the bearing assembly, and will also help to ensure that lower surface 15 will form a seal with the upper surface of the bearing assembly. Barrier member 40 should similarly be positioned against the lower surface of the bearing assembly. Once the components have been assembled in this manner, this entire assembly is inserted into a mold as shown in FIG. 5. It will be understood, however, that barrier member 40, bearing assembly 30 and molding pin 10 may alternatively be positioned one at a time within the mold.

As is well known to those skilled in the art, a typical mold assembly for use in an injection molding procedure comprises an upper half (or core) 51, and a lower half (or cavity) 52. When the upper and lower halves 51 and 52 are brought together as shown in FIG. 5, a mold cavity 53 is provided therebetween. The shape of cavity 53 defines the shape of the part being molded. Upper mold half 51 also includes a gate (or port) 63 through which molten plastic may be injected into mold cavity 53. Lower mold half 52 also includes a bore 58 which extends downwardly into lower half 52. Bore 58 is sized and shaped to accommodate shaft 12 of molding pin 10, as further described below. An annular recess 62 is provided at the upper end of bore 58, in order to provide relief which reduces or eliminates load on the inner race of the bearing assembly.

Molds typically used for injection molding of plastic parts also include one or more knock-out pins (or ejectors) which are used to release the part from the mold after the molding operation has been complete. In the exemplary mold assembly shown in FIG. 5, a knock-out pin 56 is provided, and extends upwardly through lower mold half 52. Knock-out pin 56 is generally moveable in an axial direction, as shown by the arrow in FIG. 5. In a typical molding operation, knock-out pin 56 would be used to eject the part after molding has been completed. Ejection may be accomplished, for example, by merely causing knock-out pin 56 to be urged in the direction of the arrow shown in FIG. 5. Knock-out pin 56 may also include a shoulder 57 spaced downwardly away from upper end 59 of knock-out pin 56.

Although knock-out pin 56 is shown as extending through the central portion of mold cavity 53, it's location can be varied as needed. The location of knock-out pin 56 will preferably correspond to the location of the insert with respect to the part being molded. As also seen in FIG. 5, knock-out pin 56 extends through the center of bore 58, with the longitudinal axis of knock-out pin 56 aligned with the longitudinal axis of bore 58. As will be further described below, the alignment of knock-out pin 56 with bore 58 allows knock-out pin 56 to act as an alignment member for the molding pin.

As is well-known to those skilled in the art, the mold assembly may also include other componentry typically found in injection molding apparatus, including, for example, ejectors, water circuits (for cooling), side actions, lifters, vacuum ports (to allow for negative pressure molding), pressure transducers and thermocouples.

Figure 6:
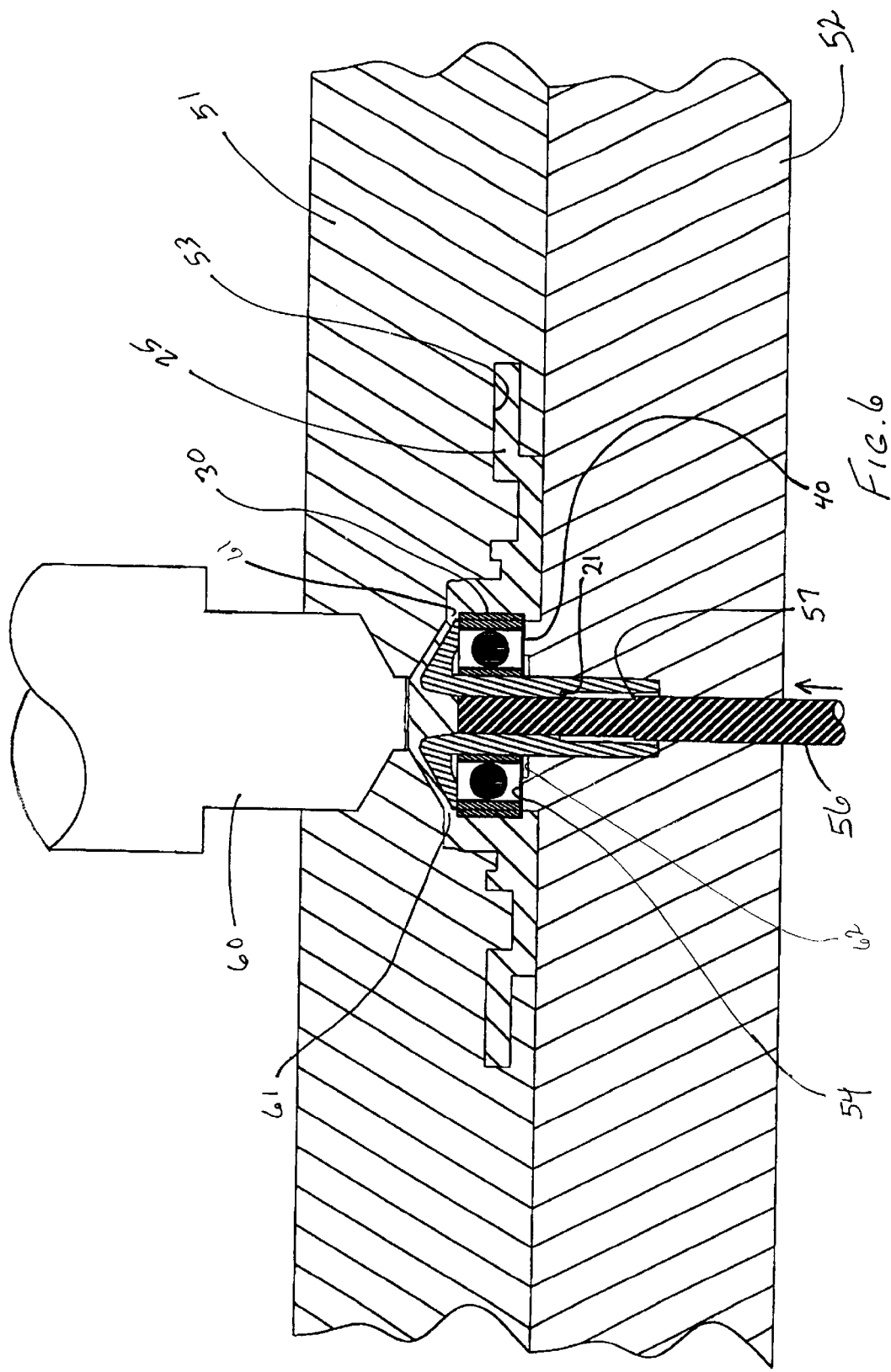
FIG. 6 is a cross-sectional view of a molding process according to an embodiment of the present invention.

Prior to the actual molding step, the assembly depicted in FIG. 1 is positioned in mold cavity 53 as shown in FIG. 6. Thus, shaft 12 of molding pin 10 is inserted into bore 58 of lower half 52 of the mold such that upper end 59 of knock-out pin 56 will enter bore 13 of shaft 12 of molding pin 10. In this manner, knock-out pin 56 assures proper alignment of molding pin 10. Molding pin 10 is urged downwardly into bore 58 so that barrier member 40 and bearing assembly 30 will rest upon ledge 54 in mold cavity 53 (see FIG. 5), with inner ring 32 of bearing assembly 30 located above annular recess 62. Knock-out pin 56 and bore 13 of shaft 12 should be sized to provide a somewhat snug fit having little side-to-side play, yet still allowing molding pin 10 to be readily removed from knock-out pin 56 once molding has been completed. In this manner, bearing assembly 30 will be further protected from deformation during the molding process.

Preferably, bore 58 of lower mold half 52 is sized such that barrier member 40 and bearing assembly 30 may rest firmly against ledge 54 of mold cavity 53. In this manner, molten plastic will be prevented from entering the region between barrier member 40 and ledge 54. The outer diameter of ledge 54 should be slightly less than the diameter of bearing assembly 30 such that bearing assembly 30 protrudes slightly beyond ledge 54 (as best seen in FIG. 6). In this manner, molten plastic will flow beneath bearing assembly 30 adjacent ledge 54 so that the bearing assembly will remain in place in the molded part. The height "A" of mold cavity 53 immediately adjacent ledge 54 (see FIG. 5) should be somewhat greater than the height of bearing assembly 30 such that the plastic in the final molded part will extend both above and below the bearing assembly. Similarly, the diameter of mold cavity 53 at 55 should also be greater than the diameter of bearing assembly 30, so that the plastic in the final molded part will extend around the circumference of the bearing assembly.

The diameter of head portion 11 of molding pin 10 is preferably somewhat less than the diameter of bearing assembly 30. Therefore, when molding pin 10, bearing assembly 30 and barrier member 40 have been properly positioned within mold cavity 53 as shown in FIG. 6, molten plastic will be allowed to fill the region between the outer edge of head portion 11 and the outer circumference of bearing assembly 30, thus further holding the bearing assembly in place in the final molded part. Thus, as shown in the cross-sectional view of the final molded part (FIG. 8), plastic will extend about the entire circumference of the bearing assembly and will extend inwardly over a portion of outer ring 31 of the bearing assembly. In this manner, bearing assembly will be firmly held in place in the molded part by the solidified plastic.

Once the molding pin, bearing assembly and barrier member have been positioned within mold cavity 53 and the mold closed (as seen in FIG. 6), a nozzle 60 injects molten plastic into the mold cavity. It should be noted that nozzle 60 is merely shown schematically in FIG. 6, since the configuration of nozzle 60 is not a subject of the present invention as claimed herein. Nozzle 60 may be replaced by any of a variety of mechanisms for injecting or urging molding material (such as molten plastic) into mold cavity 53. The initial cold slug of plastic from nozzle 60 enter into flared portion 22 of bore 12 in molding pin 10. Thereafter, the molten plastic which follows the cold slug will flow across upper surface 14 of head portion 11 of molding pin 10. Mold cavity 53 is sized such that a small gap 61 is provided between upper surface 14 of head portion 11 of molding pin 10 and the upper wall of mold cavity 53. In this manner, the molten plastic will flow through gap 61 about the circumference of head portion 11 so as to fill mold cavity 53 and extend around the circumference of bearing assembly 30.

During the molding procedure, barrier member 40 is sandwiched between the lower surface of bearing assembly 30 and ledge 54 of mold cavity 53. Since barrier member 40 preferably has a diameter approximately equivalent to the diameter of bearing assembly 30, molten plastic will also cover a portion of the periphery of barrier member 40, thereby securing barrier member 40 in place in the final molded part. Barrier member 40 also acts to form a seal between barrier assembly 30 and ledge 54, thus preventing molten plastic from entering between bearing assembly 30 and ledge 54.

Once the plastic has cooled and solidified within mold cavity 53, the mold may be opened by merely moving upper mold half 51 away from lower mold half 52. Knock-out pin 56 may then be urged upwardly in the direction of the arrow in FIG. 6, thereby urging the molded part away from lower mold half 52. Since molded part 25 may resist removal from lower mold half 52, knock-out pin 56 may be overdriven such that shoulder 57 on knock-out pin 56 is urged against shoulder 21 provided in bore 13 of shaft 12 of the molding pin. In this manner, shoulder 57 on knock-out pin 56 will further urge molding pin away from lower mold half 52. Since, as further described below, molding pin 10 is secured to part 25 by a layer of plastic which extends over upper surface 14 of molding pin 10, shoulder 57 will also urge part 25 away from lower mold half 52.

Figure 7:
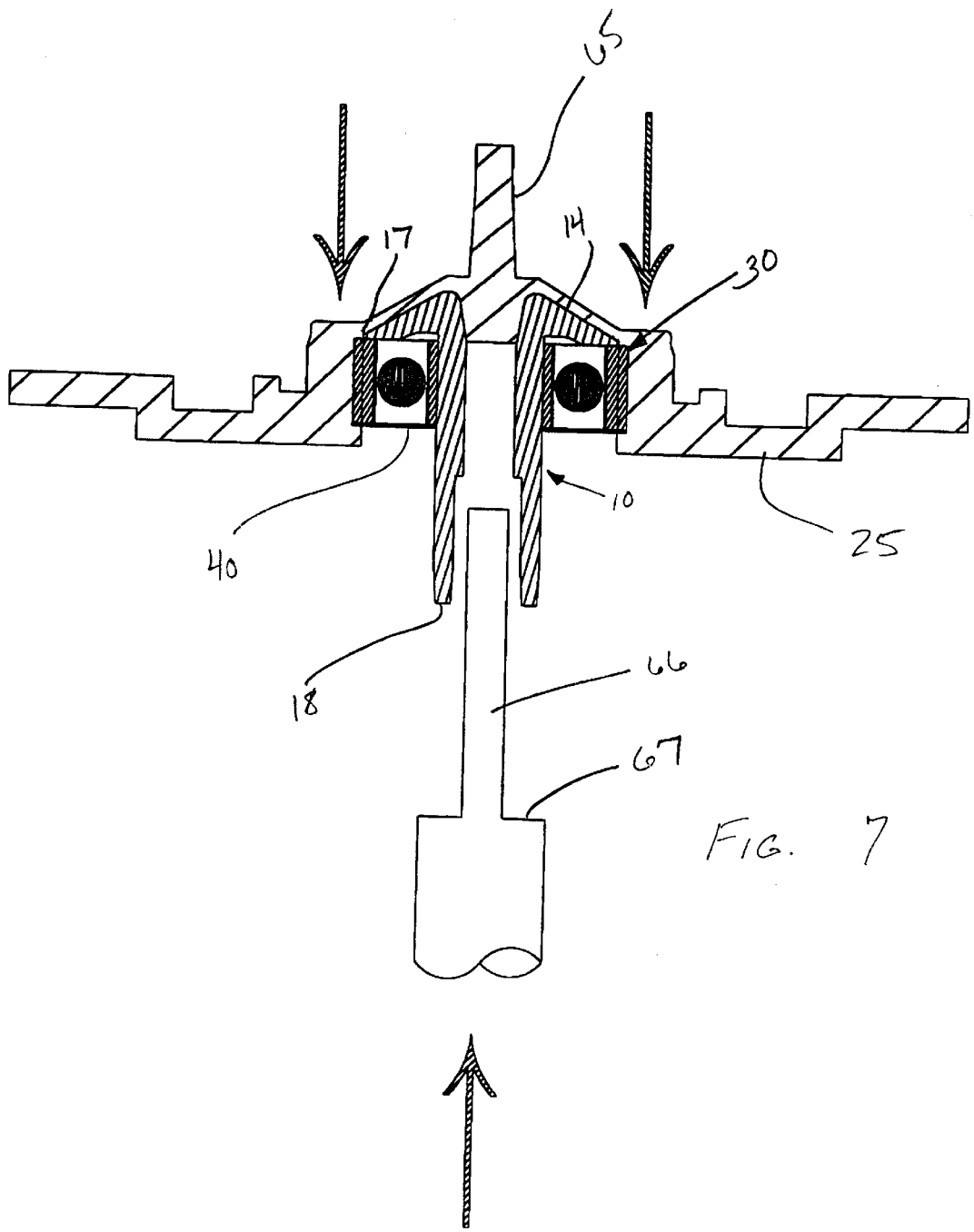
FIG. 7 is cross-sectional view of a molded part made according to an embodiment of the present invention, and depicts the removal of the molding pin therefrom.

FIG. 7 depicts molded part 25 after it has been removed from the mold cavity. As seen in FIG. 7, since the molten plastic flowed across upper surface 14 of molding pin 10, the solidified plastic will seal molding pin 10 to part 25. In addition, a portion of solidified plastic will extend above molding pin 10 as a sprue 65. Molding pin 10 and the excess plastic should be removed from molded part 25 in order to expose bearing assembly 30.

Molding pin 10 may be urged upwardly away from part 25 such that flange 17 severs the solidified plastic adjacent the outer circumference of head portion 11 of molding pin 10. This may be accomplished in a variety of manners, and FIG. 7 shows one exemplary technique. In the embodiment of FIG. 7, an elongate member such as punch 66 having a shoulder 67 is provided. Punch 66 is sized such that molded part 25 having molding pin 10 embedded therein may be slid onto punch 66 such that punch 66 passes into bore 13 of shaft 11 of molding pin 10. Molded part 25 is then urged downwardly in the direction shown in FIG. 7 and/or punch 66 is urged upwardly, as shown. Downward force may be exerted on molded part 25 at a variety of locations, however it is preferred that the force be applied in the thickest region of molded part 25 which does not coincide with the location of molding pin 10.

Figure 8:
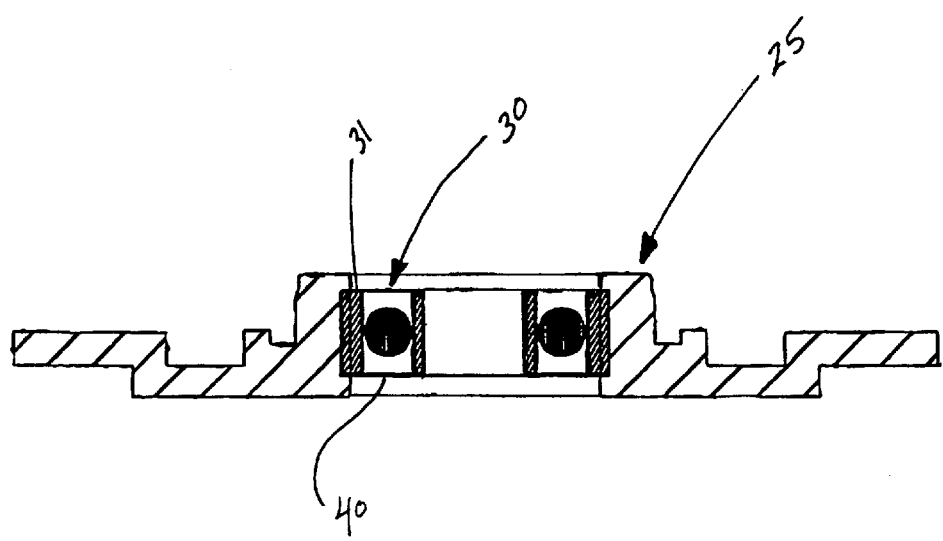
FIG. 8 is cross-sectional view of the molded part of FIG. 7, after the molding pin has been removed therefrom.

As molded part 25 and/or punch 66 are urged towards one another, shoulder 67 on punch 66 will be urged against lower end 18 of shaft 12 of molding pin 10. In this manner, molding pin 10 will be urged upwardly away from molded part 25 such that flange 17 will sever the solidified plastic immediately above the outer circumference of head portion 11 of molding pin 10. In this manner, molding pin 10 and the excess plastic (including sprue 65) are separated from molded part 25, thereby leaving molded part 25 having bearing assembly 30 embedded therein (as shown in FIG. 8). Solidified plastic extends about the entire outer circumference of bearing assembly 30, and also extends inwardly across a portion of outer ring 31 of bearing assembly 30. In the embodiment shown, solidified plastic also extends above and below bearing assembly 30, such that bearing assembly 30 is somewhat recessed in part 25. Since only the outermost portions of outer ring 31 of bearing assembly 30 are covered by the solidified plastic, bearing assembly 30 remains operable in molded part 25.

The foregoing description of preferred embodiments is by no means exhaustive of the variations in the present invention that are possible, and has thus been presented only for purposes of illustration and description. Obvious modifications and variations will be apparent to those skilled in the art in light of the teachings of the foregoing description. Thus, it is intended that the present invention be defined by the claims appended hereto.

What we claim is:

1. A method of molding a part around an insert, comprising the steps of:
   (a) providing an insert, said insert having a passageway therethrough;
   (b) providing a pin, said pin comprising a shaft and a head portion positioned at one end of said shaft, said head portion having a sharp edge extending about at least a portion of its circumference;
   (c) positioning said pin and said insert within a mold for a part to be molded, with the shaft of said pin positioned within the passageway of said insert;
   (d) flowing molding material across the upper surface of the head portion of said molding pin into the mold and about said insert, thereby forming a part having said insert therein; and
   (e) urging said pin away from the part such that the sharp edge of said head portion releases the pin from the part.

2. The method of claim 1, wherein said insert comprises a bearing assembly.

3. The method of claim 1, wherein said molding material comprises molten plastic, and said step of flowing molding material comprises injecting said molten plastic across the upper surface of the head portion of said molding pin into the mold.

4. The method of claim 1, wherein said pin further includes a bore which extends at least partially through said shaft, said mold further includes an alignment member, and said pin is positioned within the mold such that said alignment member extends at least partially into said bore.

5. The method of claim 4, wherein said alignment member comprises a knock-out pin.

6. The method of claim 5, further comprising the step urging said knock-out pin away from said mold such that said part is urged out of said mold.

7. The method of claim 1, wherein said insert has a lower surface, and further comprising the steps of providing a barrier member, and positioning said barrier member between the lower surface of said insert and said mold.

8. A method of molding a part around an insert, comprising the steps of:
   (a) providing an insert, said insert having a passageway therethrough;
   (b) providing a pin, said pin comprising a shaft, a head portion positioned at one end of said shaft, and a bore which extends at least partially through said shaft;

(c) providing a mold, said mold including an alignment member;

(c) positioning said pin and said insert within a mold for a part to be molded, with the shaft of said pin positioned within the passageway of said insert, and said alignment member of the mold extending at least partially into said bore; and (d) flowing molding material across the upper surface of the head portion of said molding pin into the mold and about said insert, thereby forming a part having said insert therein.

9. The method of claim 1, Wherein said head portion is provided with a flange that includes said sharp edge.

10. The method of claim 1, wherein said pin further includes a bore which extends at least partially through said shaft.

11. The method of claim 10, wherein said bore is provided with a flared portion adjacent said head portion to aid in removal of a cold slug after molding has been completed.

12. The method of claim 10, wherein said bore defines a shoulder.

13. The method of claim 10, wherein said bore includes a first portion with a first diameter and a second portion with a second diameter and wherein said first diameter is narrower than said second diameter.

14. The method of claim 13, wherein said first portion is located closer to said head portion than said second portion.

15. The method of claim 13, further comprising a shoulder defined at a juncture between said first portion and said second portion.

16. The method of claim 1, wherein said shaft includes exterior surfaces that taper towards each other to facilitate insertion of said shaft into said passageway of said insert.

17. The method of claim 4, wherein said shaft includes interior surfaces that define a tapering portion of said bore to facilitate insertion of said alignment member into said bore.

18. The method of claim 8, further comprising the steps of providing said head portion with a flange including a sharp edge and urging said pin away from said part such that said sharp edge releases said pin from said part.

19. The method of claim 8, wherein said insert comprises a bearing assembly.

20. The method of claim 8, wherein said insert has a lower surface, and further comprising the steps of providing a barrier member, and positioning said barrier member between said lower surface of said insert and said mold.

* * * * *